United States Patent Office 2,956,083
Patented Oct. 11, 1960

2,956,083
PHENYL-ALKYNE-DIOLS

Peter Werner Feit, Kongens Lyngby, Denmark, assignor to Lovens Kemiske Fabrik VED A. Kongsted, Copenhagen, Denmark No Drawing. Filed Dec. 30, 1958, Ser. No. 783,685
Claims priority, application Great Britain Jan. 2, 1958
3 Claims. (Cl. 260—618)

This invention is concerned with new phenyl-alkyne-diols having the general formula:

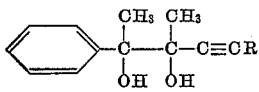

in which R is selected from the class consisting of hydrogen and methyl. Thus, the new substances are 2-phenyl-3-methyl-2,3-dihydroxy-pentyne (4) and 2-phenyl-3-methyl-2,3-dihydroxy-hexyne-(4).

They are useful as sedatives, particularly as transquilizers. In biological tests with small mammals it has been found that the compounds are capable of exerting a long lasting sedative action producing muscular relaxation, and, with larger doses, loss of righting reflexes. Furthermore, they produce blocking of polysynaptic reflexes in the spinal cord of cats, but exert no action on monosynaptic reflexes, on the myoneural junction, or on the conduction in peripheral nerves.

The new compounds compare favourably with known tranquilizers, such as 2-methyl-2-n-propyl-1,3-propane-diol dicarbamate (meprobamate) and 2-p-chlorophenyl-3-methyl-2,3-butanediol (phenaglycodol) in their effectiveness in prolonging sleep produced by 1,5-dimethyl-5-(1-methylbutyl)-barbituric acid (hexobarbital), and in this respect they are superior to the 2-phenyl-3-methyl-2,3-dihydroxyhexene-(5) and its p-chloro-derivative.

Clinical experience has shown that the new compounds compare favourably with meprobamate as a tranquilizer for patients suffering from senile psychic disturbances, such as depressions, confusions, restlessness and excitements.

The 2-phenyl-3-methyl-2,3-dihydroxy-pentyne-(4) can be produced by reacting 2-phenylacetoin with acetylene or an alkali metal acetylide, and the 2-phenyl-3-methyl-2,3-dihydroxy-hexyne-(4) can be prepared by reacting 2-phenylacetoin with methylacetylene or a metal compound thereof.

Example 1

Sodium acetylide is prepared in known manner from 9.2 g. of sodium dissolved in 500 ml. of liquid ammonia and acetylene, and the solution of the sodium acetylide is cooled down to a temperature between —50° and —40° C. At this temperature 16.4 g. of 2-phenylacetoin are added dropwise while stirring and introducing acetylene. Thereafter, the temperature of the reaction mixture is increased to about —33° C., and the ammonia is allowed to evaporate during about 10 hours. Ether is poured on the residue which is then decomposed by adding dilute sulphuric acid under cooling. The ether solution is washed with water and dried over MgSO$_4$. The ether is distilled off, and the residue is distilled in vacuo yielding 2 - phenyl - 3 - methyl-2,3-dihydroxy-pentyne-(4) with boiling point 153–155° C. at 15 mm. Hg.

Example 2

In an autoclave provided with a stirrer a mixture of 82 g. of 2-phenylacetoin and 80 ml. of a 3% aqueous solution of potassium carbonate is reacted with a mixture of 75 vol. percent of acetylene and 25 vol. percent of nitrogen at 20 atmospheres and 95° C. The said pressure is maintained by introducing more of the gaseous mixture until the pressure remains constant indicating that the reaction has been terminated. Thereafter, the reaction mixture is extracted with ether, and the ether solution is dried over MgSO$_4$. The ether is distilled off, and the residue is distilled in vacuo yielding 2-phenyl-3-methyl-2,3-dihydroxy-pentyne-(4) with boiling point 150–152° C. at 12 mm. Hg.

Example 3

A solution of sodium amide in liquid ammonia is prepared in known manner from 9.2 g. of sodium, 0.15 g. of ferric nitrate and 600 ml. of liquid ammonia, and the solution is cooled down to a temperature between —50° and —40° C. At this temperature 20 g. of gaseous methylacetylene are added during 20 minutes while stirring. The stirring is continued for one hour while the temperature of the reaction mixture is gradually increased to about —33° C. Now, 16.4 g. of 2-phenylacetoin are added dropwise while stirring, and thereupon the ammonia is allowed to evaporate during about 10 hours. Ether is poured on the residue which is then decomposed by adding dilute sulphuric acid under cooling. The ether solution is washed with water and dried over MgSO$_4$. The ether is distilled off, and the residue is distilled in vacuo yielding 2-phenyl-3-methyl-2,3-dihydroxy-hexyne-(4) with boiling point 170–176° C. at 14 mm. Hg.

I claim:
1. As substances phenyl-alkyne-diols having the general formula:

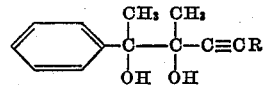

in which R is selected from the class consisting of hydrogen and methyl.
2. 2-phenyl-3-methyl-2,3-dihydroxy-pentyne-(4).
3. 2-phenyl-3-methyl-2,3-dihydroxy-hexyne-(4).

References Cited in the file of this patent

Venus-Danilova et al.: Zhurnal Obshchey Khimii (U.S.S.R.), vol. 28 (1958), pages 1477–82 (6 pages).